United States Patent
Takizawa et al.

(10) Patent No.: US 6,388,706 B1
(45) Date of Patent: May 14, 2002

(54) IMAGE PROCESSING METHOD FOR ACTIVELY EDGE-ENHANCING IMAGE DATA OBTAINED BY AN ELECTRONIC CAMERA

(75) Inventors: Naruo Takizawa; Po-Chieh Hung, both of Hino (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 08/928,095

(22) Filed: Sep. 12, 1997

(30) Foreign Application Priority Data

Sep. 18, 1996 (JP) ............................................. 8-246423
Oct. 17, 1996 (JP) ............................................. 8-275047
Mar. 14, 1997 (JP) ............................................. 9-061385

(51) Int. Cl.[7] .............................. H04N 3/14; G06K 9/00
(52) U.S. Cl. ......................... 348/273; 348/272; 382/167
(58) Field of Search ................................ 348/266, 272, 348/273, 234, 252, 222; 358/525, 532; 382/162, 167, 272

(56) References Cited

U.S. PATENT DOCUMENTS

| 4,642,678 A | | 2/1987 | Cok | |
|---|---|---|---|---|
| 5,373,322 A | * | 12/1994 | Laroche et al. | 348/273 |
| 5,382,976 A | * | 1/1995 | Hibbard | 348/273 |
| 5,506,619 A | * | 4/1996 | Adams, Jr. et al. | 348/272 |
| 5,682,205 A | * | 10/1997 | Sezan et al. | 358/525 |
| 5,778,106 A | * | 7/1998 | Juenger et al. | 382/167 |
| 5,805,217 A | * | 9/1998 | Lu et al. | 348/273 |

FOREIGN PATENT DOCUMENTS

| JP | 63-263088 | 9/1988 |
|---|---|---|
| JP | 03-166825 | 7/1991 |
| JP | 04-2273 | 1/1992 |
| JP | 06-113147 | 4/1994 |

* cited by examiner

Primary Examiner—Wendy R. Garber
Assistant Examiner—Rashawn N. Tillery
(74) Attorney, Agent, or Firm—Frishauf, Holtz, Goodman, Langer & Chick, P.C.

(57) ABSTRACT

An image processing method for an electronic camera which includes a photoelectric element having plural sensors and color filters in plural different colors, wherein each of the plural sensors corresponds to a respective one of the color filters in the different colors. The method includes the steps of: obtaining a signal value from a target sensor of the sensors when one of the sensors is assigned to the target sensor; obtaining the first average value from signal values of the sensors having the color filters of which a color is the same as that of the color filter of the target sensor; obtaining the second average value from signal values of the sensors having the color filters of which a color is different from that of the color filter of the target sensor; and obtaining an interpolation value for a color, which is different from that of the color filter of the target sensor, of the target sensor according to the signal value from the target sensor, the first average value and the second average value.

13 Claims, 10 Drawing Sheets

| G11 | R12 | G13 | R14 | G15 | R16 |
|---|---|---|---|---|---|
| B21 | G22 | B23 | G24 | B25 | G26 |
| G31 | R32 | G33 | R34 | G35 | R36 |
| B41 | G42 | B43 | G44 | B45 | G46 |
| G51 | R52 | G53 | R54 | G55 | R56 |
| B61 | G62 | B63 | G64 | B65 | G66 |

| G11 | R12 | G13 | R14 | G15 | R16 |
|---|---|---|---|---|---|
| B21 | G22 | B23 | G24 | B25 | G26 |
| G31 | R32 | G33 | R34 | G35 | R36 |
| B41 | G42 | B43 | G44 | B45 | G46 |
| G51 | R52 | G53 | R54 | G55 | R56 |
| B61 | G62 | B63 | G64 | B65 | G66 |

| Mg | G |
|---|---|
| Cy | Ye |

| W | G |
|---|---|
| Cy | Ye |

| G | Cy |
|---|---|
| Ye | G |

IMAGE PROCESSING METHOD FOR ACTIVELY EDGE-ENHANCING IMAGE DATA OBTAINED BY AN ELECTRONIC CAMERA

BACKGROUND OF THE INVENTION

The present invention relates to an electronic camera and an image processing method, more specifically, in a single plate electronic camera employing a photoelectric conversion element and a color filter, the electronic camera wherein a color signal value of which color is different from a filter color of each pixel is obtained by interpolation, and a method of an image compression and decompression process employed in said electronic camera and the like.

Conventionally, the single board sensor electronic camera has been known wherein a color filter is put on each of pixels of a photoelectric conversion element such as a CCD (Charge Coupled Device), and color image signals are obtained.

In the above-mentioned single board sensor electronic camera, as shown, for example, in FIG. 2, a mosaic color filter is employed wherein in order to obtain a brightness signal (Green signal) for which a high degree of resolution is required, Green filters are arranged in a checkerboard pattern, while in order to obtain two kinds of color signals (Red and Blue signals), Red filters and Blue filters are arranged in the checkerboard pattern.

Furthermore, as the above-mentioned color filters, there are one composed of R, G, B as shown in FIG. 2 and the other composed of the combination such as (W, G, Cy, Ye), (G, Cy, Ye) and (Mg, G, Cy, Ye), etc. wherein W represents white; Cy represents cyan; Ye represents yellow and Mg represents magenta.

In the single board sensor electronic camera as mentioned above, when employing, for example, color filters consisting of R, B, G, information on any one of R, G, B for each pixel is only obtained. Accordingly, there is a case such that the interpolation calculation on image signals is performed and each of the R, G, B data is obtained for each pixel.

For example, U.S. Pat. No. 4,642,678 discloses a structure wherein in an arrangement utilizing an R, X, B mosaic filter, when a Green signal value is obtained by the interpolation for the pixel of an s filter or a B filter, the average value of four G filter pixels adjacent to a target pixel is put as a Green signal of the target pixel. Furthermore, there is a disclosure of a structure wherein when a Red signal value and Blue signal value are obtained by interpolation, the Red signal value and the Blue signal value are linearly interpolated according to the signal value of a pixel of a Red filter and a Blue filter adjacent to the target pixel and a Green signal value interpolated at said adjacent pixel, the Green signal value interpolated at said adjacent pixel and the Green signal (original signal value for G filter pixel and interpolated value for the R and B filter pixels) at the target pixel.

Furthermore, "Digital Camera Utilizing Newly Developed Compression and Interpolation Processing" in the Proceedings of Fine Imaging Symposium (1995) of the Japan Photographic Society discloses a structure wherein upon recognizing an edge pattern, an interpolation direction is set which is pertinent for the recognized pattern, and the interpolation is performed using a pixel signal value in said interpolation direction.

Further, U.S. Pat. No. 5,373,322 discloses a structure wherein in an arrangement composed of a R, G, B mosaic filter as shown in FIG. 2, for the interpolation, for example, of a Green signal, the gradient of a color signal Blue and Red for an target pixel is obtained and the direction suitable for the interpolation is determined according to said gradient, and the interpolation value is obtained.

In the following, is shown examples of the interpolation calculation of G signal 34 at pixel R34 of a Red filter shown in FIG. 2 and a G signal G43 at a pixel B43 of a B filter.

In the interpolation operation of G34, at first, the gradient for R34 from R32, R36 and R14 is calculated according to the following expressions.

$$Hdiff=|(R32+R36)/2-R34|$$

$$Vdiff=|(R14+R54)/2-R34|$$

wherein Hdiff represents the gradient in the horizontal direction against R34 and Vdiff represents the gradient in the perpendicular direction.

And, when Hdiff<Vdiff, $$put\ G34=(G33+G35)/2.$$

When Hdiff>Vdiff $$put\ G34=(G24+G44)/2.$$

When Hdiff=Vdiff $$put\ G34=(G24+G44+G33+G35)/4.$$

In the same way, in the interpolation operation of G43, the gradient for B43 is first calculated from B41, B45, B23 and B63 according to the following expressions.

$$Hdiff=|(B41+B45)/2-B43|$$

$$Vdiff=|(B23+B63)/2-B43|$$

And, when Hdiff<Vdiff, $$put\ G43=(G42+G44)/2.$$

When Hdiff>Vdiff, $$put\ G43=(G33+G53)/2.$$

When Hdiff=Vdiff, $$put\ G43=(G33+G53+G42+G44)/4.$$

On the other hand, the interpolation of R signals and B signals is performed under such a structure that a linear interpolation is carried out utilizing a pixel of a G filter and signals of a R filter and a B filter adjacent closely to said pixel.

In the following, the interpolation operation expressions are shown for R33, R43 and R44 of the R signal.

$$R33=((R32-G32)+(R34-G34)/2+G33$$

$$R43=((R32-G32)+(R34-G34)+(R52-G52)+(R54-G54)/4+G43$$

$$R44=((R34-G34)+(R54-G54)/2+G44$$

In addition, in the following, are shown operation expressions of B33, B34 and B44 of the B signal.

$$B33=((R23-G23)+(R43-G43)/2+G33$$

$$B34=((R23-G23)+(R25-G25)+(B43-G43)+(R45-G45))/4+G34$$

$$B44=((B43-G43)+(B45-G45))/2+G44$$

On the other hand, in the above-mentioned electronic camera, conventionally, the image data have undergone compression which are recorded in a semiconductor memory, etc. and for said compression, a method utilizing an orthogonal transformation coding has been mainly employed.

For example, in the JPEG (Joint Photographic Coding Experts) compression, the RBG signals are subjected to orthogonal transformation through DTC (Discrete Cosine Transformation) while putting 8×8 pixel as one unit, and then quantized, and Huffman coded to be compressed data. The compressed data are stored or transmitted. When the compressed data are decompressed (extended), the image is reproduced thorough the reverse process mentioned above.

As mentioned above, the orthogonal transformation coding is performed under dividing the image region into a plurality of blocks. Therefore, in the image decompression (image extension), there has been a problem such as a phenomenon wherein the joint of the blocks is not natural (hereinafter referred to as block deformation). various methods have been proposed for improving said block deformation.

For example, Japanese Patent Publication Open to Public Inspection No. 63-236088 discloses a structure wherein the orthogonal transformation coding is performed so that each block is overlapped, and Japanese Patent Publication Open to Public Inspection No. 3-166825 discloses a structure wherein a low-pass filter is applied to the portion which is judged to be a flat portion of an image. Furthermore, Japanese Patent Publication Open to Public Inspection No. 4-2273 discloses a structure wherein random noise is added to the neighbor of a block boundary or a low-pass filter is applied to that. Still further, Japanese Patent Publication Open to Public Inspection No. 6-113147 discloses a structure wherein for an image having a block deformation, a low-pass filter is applied to the portion having the deformation upon judging the presence of the deformation from the boundary.

Incidentally, in the interpolation method in the mosaic filter disclosed in the above-mentioned U.S. Pat. No. 4642678, in the Blue filter pixel, when obtaining the Red signal value by interpolation, the Green and Red signals are only employed. In the same way, when interpolating the Blue signal by the Red filter pixel, the structure is such that the Green and Blue signal values are only employed. In the interpolation of the B signal in the R filter pixel, a structure is such that the signal value of the target pixel is not employed for the interpolation operation. Therefore, according to the above-mentioned interpolation method, problems are caused such that the color reproduction and sharpness are deteriorated.

In a method which determines the direction of interpolation operation by performing the pattern recognition of an edge, there have been a problem such that the operation load is large due to the discrimination of an image pattern and the interpolation process is slow. Furthermore, there have been another problem such that because in the same way as mentioned above, B and R signal values are interpolated according to signal values of G and B or G and R without utilizing the target signal value, the color reproduction is not sufficient.

Furthermore, in U.S. Pat. No. 5,373,322, there is a problem such that the interpolation of G signals which are brightness signals is performed according to the gradient of R and B signals which are color signals, and as a result, the interpolation is performed irrespective of the G gradient. Further, regarding to the interpolation of the color signals, there is another problem such that because the linear interpolation is performed utilizing the interpolated G signals, the color reproduction of a whole image is not sufficient. Furthermore, a defect is caused such that the process is slow because of judging the gradient.

Furthermore, in each of conventional technologies mentioned above, the interpolation is performed utilizing a pixel in one dimensional direction or pixels adjacent closely to the target pixel. In such the structure, there has been a problem such that the color reproduction is not sufficient because the number of reference pixels is small.

On the other hand, in the above-mentioned conventional methods for improving the block distortion, when letting the blocks overlap, there is a problem such that it is required to undergo process different from a standard compression method. In a structure wherein the random noise is added, there has been a problem such that an image becomes rough due to the addition of the noise. Furthermore, in a structure wherein the low-pass filter is applied upon judging the flat portion, or wherein the low-pass filter is applied upon judging the presence of the block distortion, the operation load is enlarged because the judgment process is required and when the judgment process is not performed suitably, on the contrary, the image quality tends to be degraded.

SUMMARY OF THE INVENTION

In view of the above-mentioned problems, the present invention has been accomplished. An object of the present invention is to provide, in a single board sensor electronic camera, an interpolation process which results in excellent color reproduction and sharpness, and further shortens processing time.

In addition, another object of the present invention is to provide a method wherein in a simple image processing, a block distortion is decreased without causing the deterioration of image quality.

The present invention which accomplishes the above-mentioned objects is an image processing method of an electronic camera which comprises a photoelectric element having plural sensors and color filters in plural different colors, wherein each of the plural sensors corresponds to a respective one of the color filters in the different colors. The image processing method comprises the following processes: 1) when one of the plural sensors is assigned to a target sensor, a process for obtaining a signal value from the target sensor, 2) in the desired region where the target sensor is positioned in the center, a process for obtaining the first average value from signal values of the plural sensors having the color filters of which a color is the same as that of the color filter corresponding to the target sensor, 3) in the desired region, a process for obtaining the second average value from signal values of the plural sensors having the color filters of which a color is different from that of the color filter of the target sensor and 4) according to the signal value of the target sensor, the first average value and the second average value, a process for obtaining an interpolation value for a color, which is different from that of the color filters corresponding to the target sensor, of the target sensor.

BRIEF DESCRIPTION OF THE DRAWINGS

FIGS. 2(A) and 2(B) are drawings illustrating RGB mosaic filters.

DETAILED DESCRIPTION OF THE INVENTION

In the following, an example of the present invention are explained.

Figure 1:
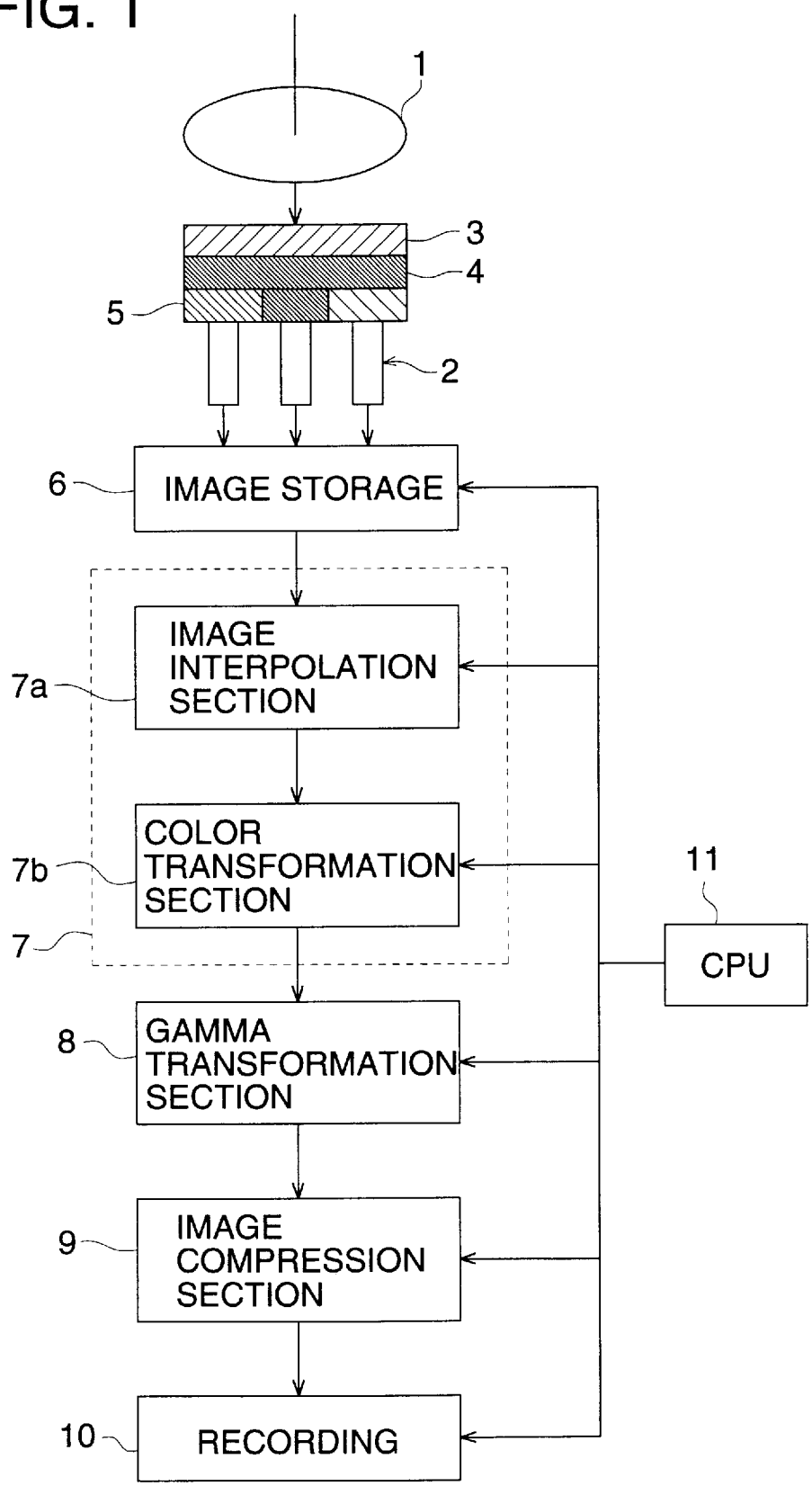
FIG. 1 is a block diagram illustrating a signal transformation process of an electronic camera in an example.

FIG. 1 is a block diagram illustrating a schematic signal transformation process of a single board sensor electronic camera related to the example.

In FIG. 1, an optical image of a subject not shown is illuminated through a taking lens 1 on a CCD 2 through various kinds of filters laminated on said CCD, and at the CCD 2, said optical image of the subject is subjected to photoelectric conversion to convert to an electric signal.

The above-mentioned various kinds of filters include, for example, an optical low-pass filter 3 which passes only the low region of spatial frequency, an infrared-cut filter 4 which cuts the infrared radiation and a mosaic filter 5 which is composed of the combination of color filters such as RGB or CMYG, etc.

Accordingly, the mosaic filter 5 has such a structure wherein the above-mentioned various kinds of filters are integrally constructed with the sensor CCD 2 and an individual color filter is installed on each of the sensors of the CCD 2 and the color filters are arranged in a checkerboard pattern for the whole CCD which is an aggregate of the sensors.

The electric signals output from the above-mentioned CCD 2 are subjected to A/D conversion and then stored once in an image storage 6.

The image data stored in the above-mentioned image storage 6 is subjected to interpolation process in an image interpolation section 7a of an image processing section 7 and further subjected to color transformation process in a color transformation process 7b.

Subsequently, the image data are subjected to adjustment of the tonal characteristic in a gamma transformation section and subjected to image compression process such as JPEG, etc. as required in an image compression section 9.

In a recording section 10, compressed data are recorded in recording medium such as a memory card, a magneto optical disk, etc.

Further, the electronic camera of the present invention includes such cameras as one having a configuration wherein an image taken by a photoelectric conversion element such as the above-mentioned CCD 2 is stored in a storage medium such as, a FLASH memory, a videotape, etc. and another having a configuration wherein an image signal is only output without having any of those storage media.

The signal transformation process shown in FIG. 1 is herein controlled by a CPU 11.

In the following, the interpolation process in the above-mentioned image interpolation section 7a is explained in detail.

Figures 2, 3, 4, 5:
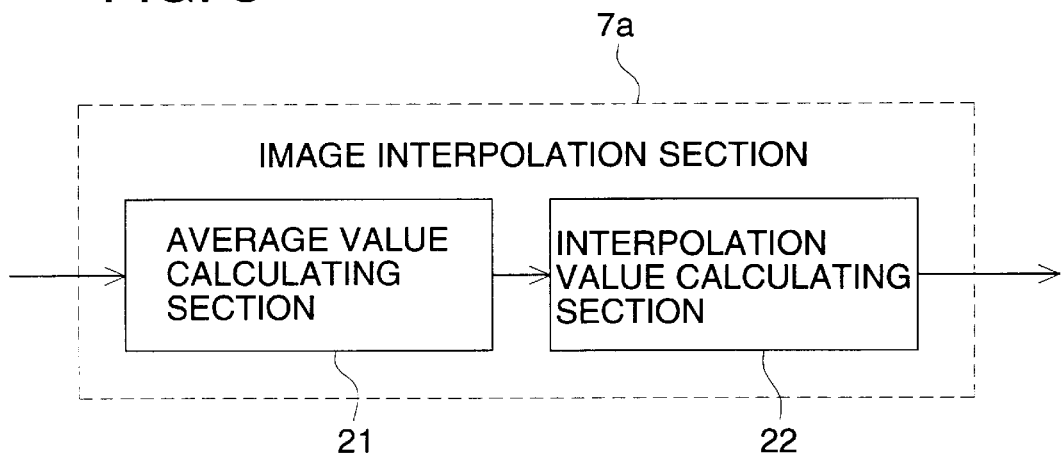
FIG. 3 is a block diagram illustrating in detail an image interpolation section.
FIG. 4 is a drawing illustrating the basic structure of a YMCG mosaic filter.
FIG. 5 is a drawing illustrating the basic structure of a YCGW mosaic filter.

Further, In the following explanation on the interpolation process, it is assumed that the RGB mosaic filter as shown in FIG. 2 is employed. In the mosaic filter in FIG. 2, Green filters are arranged in a checkerboard pattern, while in the remaining part, each of Red filters and Blue filters is equally arranged in the checkerboard pattern.

According to the image data read from the image storage 6, an average value of each color filter is calculated in the 5×5 pixel region in an average value calculating section 21 shown in FIG. 3.

When color reproduction is taken into account, a scheme may be accepted wherein the average value of each filter color in the 5×5 pixel region or larger. However, when enlarging the region, artifact increases in the neighbor of the edge. Thus, the region is preferably limited to somewhat 5×5 pixel.

On the other hand, in an interpolation calculation section 22 in FIG. 3, the interpolation value is obtained as follows.

For example, in FIG. 2, Green signals G34 and G43 corresponding to each pixel (target pixel) of R filter pixel R34 and B filter pixel B43 in FIG. 2 are interpolated according to the following formulas.

$$G34 = R34 + G'34 - R'34$$

$$G43 = B43 + G'43 - B'43$$

wherein G'34 and R'34 each represent the average value of the Green signals and Blue signals in the 5×5 pixel region wherein the target pixel R34 is positioned in the center, G'43 and B'43 each represent the average value of Green signals and Blue signals in the 5×5 pixel region in which the target pixel B43 is position in the center. Specifically, each of them is obtained by the following formula.

$$G'34 = (G13+G15+G22+G24+G26+G33+G35+G42+G44+G46+G53+G55)/12$$

$$G'43 = (G22+G24+G31+G33+G35+G42+G44+G51+G53+G55+G62+G64)/12$$

$$R'34 = (R12+R14+R16+R32+R34+R36+R52+\% 54+R56)/9$$

$$B'43 = (B21+B23+B25+B41+B43+B45+B61+B63+B65)/9$$

Further, the range for obtaining the average values is not limited to the 5×5 pixel region but may be applicable to the region such as 3×3 pixel, 3×5 pixel, 5×3 pixel, 7×5 pixel, etc. and may be weighted.

Furthermore, interpolation values of the Red signal R33, R43 and R44 corresponding to G filter pixel G33, B filter pixel B43 and G filter pixel G44 are obtained as follows.

R33=G33+R'33−G'33

R43=B43+R'43−B'43

R44=G44+R'44−G'44

In the same way as mentioned above, R'33 and G'33 each represent the average value of the Red signals and Green signals in the 5×5 pixel region in which the target pixel G33 is positioned in the center, and R'43 and B'43 represent the average value of the Red signals and Blue signals in the 5×5 pixel region in which the marked B43 is positioned in the center. Furthermore, R'44 and G'44 each represent the average value of the Red signals and Green signals in the 5×5 pixel region in which the marked G44 is positioned in the center.

Furthermore, interpolation values B33, B34 and B44 of the Blue signals corresponding to G filter pixel G33, R filter pixel B34 and G filter pixel G44 are obtained as follows.

B33=G33+B'33−G'33

B34=R34+B'34−R'34

B44=G44+B'44−G744

B'33, B'34 and B'44 each represent the average value of the Blue signals in the 5×5 pixel region in which each of G33, R34 and G44 is positioned in the center.

When the above operation results are tabulated, Table 1 is obtained. In Table 1, B, G and R each represent a signal value of the target pixel, and g, b and r each represent an interpolated value.

TABLE 1

| Target pixel | g | b | r |
|---|---|---|---|
| B | G' + B − B' | B | R' + B − B' |
| G | G | B' + G − G' | R' + G − G' |
| R | G' + R − R' | B' + R − R' | R |

As shown in Table 1, it is possible to obtain excellent color reproduction by calculating the interpolation values according to the average values of the target signal values and the signal values of each color in the desired region in which the target pixel is positioned in the center.

As a modified example of above Table 1, by letting the interpolation formula have an edge enhancement coefficient β, it is possible to vary the feature of the interpolated image. The results are shown in Table 2.

TABLE 2-A

| Target pixel | g | b | r |
|---|---|---|---|
| B | G' + β (B − B') | B' + β (B − B') | R' + β (B − B') |
| G | G' + β (G − G') | B' + β (G − G') | R' + β (G − G') |
| R | G' + β (R − R') | B' + β (R − R') | R' + β (R − R') |

As β shown in Table 2-A increases, the image sharpness is improved and when decreased, the image is blurred.

However, when β=0, Table 3 may be available in accordance with the color filter of each target pixel.

TABLE 3

| Target pixel | Output Value |
|---|---|
| B | b = B |
| G | g = G |
| R | r = R |

Furthermore, in the Bayer type primary color filter, the number of G pixels is more than that of B and R pixels. As a result, in the mosaic filter shown in FIG. 2(A), G' becomes an average value of 12 or 13 pixels. Contrary to this, R and B each are always an average of 9 pixels. When this G' is utilized like as β(G−G') as a sharpness enhancing component, the frequency characteristic of (G−G') is different from that of (B−B') or (R−R'), the edge enhancement in the diagonal direction is increased and due to this, periodic noise is caused at the G pixel.

Accordingly, without utilizing the average value G', the average value of 9 pixels in the same way as of R and B and a sharpness enhancing component is prepared. When G33 is set as a central pixel, the average value of signal values of the circled pixels in FIG. 2(B) is calculated according to the following Formula 0.

(Formula 0)

G"=(G11+G13+G15+G31+G33+G35+G51+G53+G55)/9

When this is expressed as a new interpolation calculating formula, the following table is obtained.

TABLE 2-B

| Target pixel | g | b | r |
|---|---|---|---|
| B | G' + β (B − B') | B' + β (B − B') | R' + β (B − B') |
| G | G' + β (G − G") | B' + β (G − G") | R' + β (G − G") |
| R | G' + β (R − R') | B' + β (R − R') | R' + β (R − R') |

In the foregoing, the interpolation methods of the mosaic filters shown in Table 2(A) and 2(B) are explained. However, the kind of filters is not limited and various kinds of mosaic filters are available which have a combination of complementary colors such as YMCG (yellow, magenta, cyan and green), YCG (yellow, cyan and green), etc. Here, are explained cases for the mosaic filters having structures shown in FIGS. 4 to 6. Further, FIGS. 4 to 6 each illustrate a basic structure of combination of each color filter and according to the number of pixels of CCD 2, the filter structure having the same pattern is repeatedly employed.

Figures 6, 7:
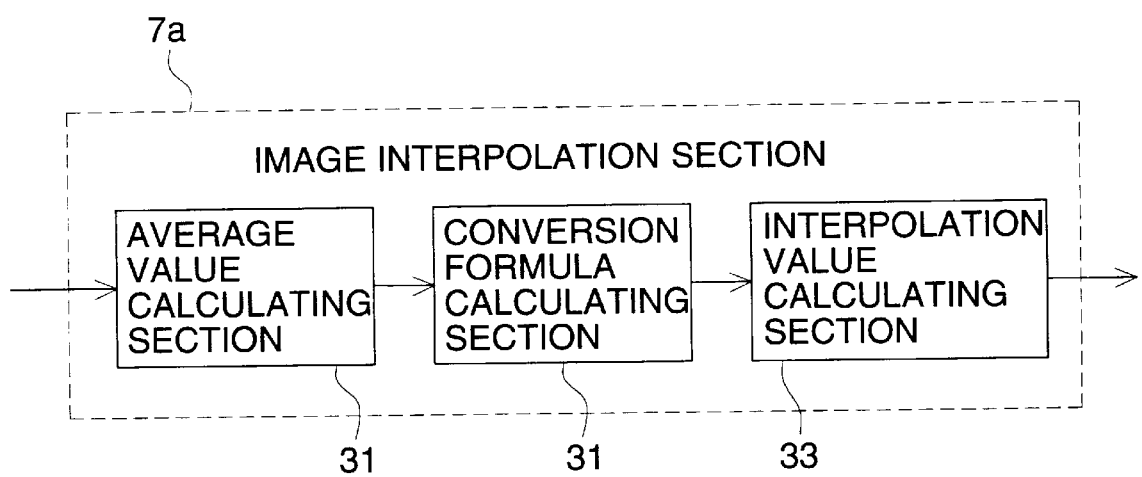
FIG. 6 is a drawing illustrating the basic structure of a YCG mosaic filter.
FIG. 7 is a block diagram illustrating the details of an image interpolation section employing a mosaic filter equipped with no R, B filters.

FIG. 7 illustrates a structure of the image interpolation section 7a, when the mosaic filters having the structures shown in the above-mentioned FIGS. 4 to 6. The image signals read from the image storage 6 in FIG. 1 are processed in the average value calculating section 32 and the G average values of each color is calculated in the 5×5 pixel region in which the target pixel is positioned in the center.

And in the transformation formula calculating section 32, signals except for RGB are transformed to RGB signals.

Furthermore, in the interpolation calculating section 33, the interpolation values are obtained according to the desired interpolation formula. For example, in the case of the YMCG mosaic filter shown in FIG. 4, according to Formula 1, the YMC signals are transformed to RGB signals in the conversion formula calculating section 32.
(Formula 1)

$$\begin{bmatrix} b' \\ r' \end{bmatrix} = \begin{bmatrix} -1 & 1 & 1 \\ 1 & 1 & -1 \end{bmatrix} \begin{bmatrix} Ye' \\ Mg' \\ Cy' \end{bmatrix}$$

In above Formula 1, Ye', Mg' and Cy' each represent each average value of yellow signal values, magenta signal values and cyan signal values in the 5×5 pixel region in which the target pixel is positioned in the center and are calculated in the above-mentioned average value calculating section 31, and b' and r' are converted values by above Formula 1 according to the above-mentioned Ye', Mg' and Cy'.

In addition, in the case of the YMCG mosaic filter, interpolation values are obtained in the above-mentioned interpolation value calculating section 33 according to the interpolation formulas shown in Table 4.

TABLE 4

| Target pixel | g | b | r |
|---|---|---|---|
| G | G' + β (G − G') | b' + β (G − G') | r' + β (G − G') |
| Ye | G' + β (Ye − Ye') | b' + β (Ye − Ye') | r' + β (Ye − Ye') |
| Mg | G' + β (Mg − Mg') | b' + β (Mg − Mg') | r' + β (Mg − Mg') |
| Cy | G' + β (Cy − Cy') | b' + β (Cy − Cy') | r' + β (Cy − Cy') |

However, when β=0, the output value at the target pixel may be put as g=G.

In Table 4, G, Ye, Mg and Cy each represent a signal value of the target pixel and g, b and r each represent an interpolation value.

On the other hand, in the case of the YCGW mosaic filter, the WYC signals are converted to RGB signals according to Formula 2.
(Formula 2)

$$\begin{bmatrix} b' \\ r' \end{bmatrix} = \begin{bmatrix} 1 & -1 & 0 \\ 1 & 0 & -1 \end{bmatrix} \begin{bmatrix} W' \\ Ye' \\ Cy' \end{bmatrix}$$

In the same manner, W', Ye', and Cy' represents independently each average value of W signals, Ye signals and Cy signals in the 5×5 pixel region in which the target pixel is positioned in the center and are calculated in the above-mentioned average value calculating section 31, and b' and r' each represent an average value of R and B converted according to the above-mentioned W', Ye' and Cy'.

In addition, in the case of the YCGW mosaic filter shown in FIG. 5, the interpolation values are obtained according to the interpolation formulas shown in Table 5.]

TABLE 5

| Target pixel | g | b | r |
|---|---|---|---|
| G | G' + β (G − G') | b' + β (G − G') | r' + β (G − G') |
| W | G' + β (W − W') | b' + β (W − W') | r' + β (W − W') |
| Ye | G' + β (Ye − Ye') | b' + β (Ye − Ye') | r' + β (Ye − Ye') |
| Cy | G' + β (Cy − Cy') | b' + β (Cy − Cy') | r' + β (Cy − Cy') |

However, when β=0, the output values at the target pixel G may be put as g=G.

In Table 5, W, Ye, Cy and G each represent a signal value of the target pixel and g, b and r each represent an interpolation value.

Further, in the case of the GCY mosaic filter, the GYC a signals are converted to RGB signals according to Formula 3.
(Formula 3)

$$\begin{bmatrix} b' \\ g' \\ r' \end{bmatrix} = \begin{bmatrix} -1 & 0 & 1 \\ 1 & 0 & 0 \\ -1 & 1 & 0 \end{bmatrix} \begin{bmatrix} G \\ Ye' \\ Cy' \end{bmatrix}$$

In Formula 3, Ye', Cy' and G' represents independently each average value of Ye signals, Cy signals and G signals in the 5×5 pixel region in which the target pixel is positioned in the center and are calculated in the above-mentioned average value calculating section 31. b', g' and r' each represent an average value of R. G and B converted according to the above-mentioned Ye', Cy' and G'.

In addition, in the case of the YCG mosaic filter, the interpolation values are obtained according to the interpolation formulas shown in Table 6.

TABLE 6

| Target pixel | g | b | r |
|---|---|---|---|
| G | G' + β (G − G') | b' + β (G − G') | r' + β (G − G') |
| Ye | G' + β (Ye − Ye') | b' + β (Ye − Ye') | r' + β (Ye − Ye') |
| Cy | G' + β (Cy − Cy') | b' + β (Cy − Cy') | r' + β (Cy − Cy') |

However, when β=0, the output values at the target pixel G may be put as g=G.

In Table 6, G, Ye and Cy each represent a signal of the target pixel and g, b and r each represent an interpolation value.

Incidentally, the above-mentioned edge enhancing coefficient β may be put as a constant value. Or as shown below, a structure may be employed wherein β varies in accordance with MTF of the optical system.

Figure 10:
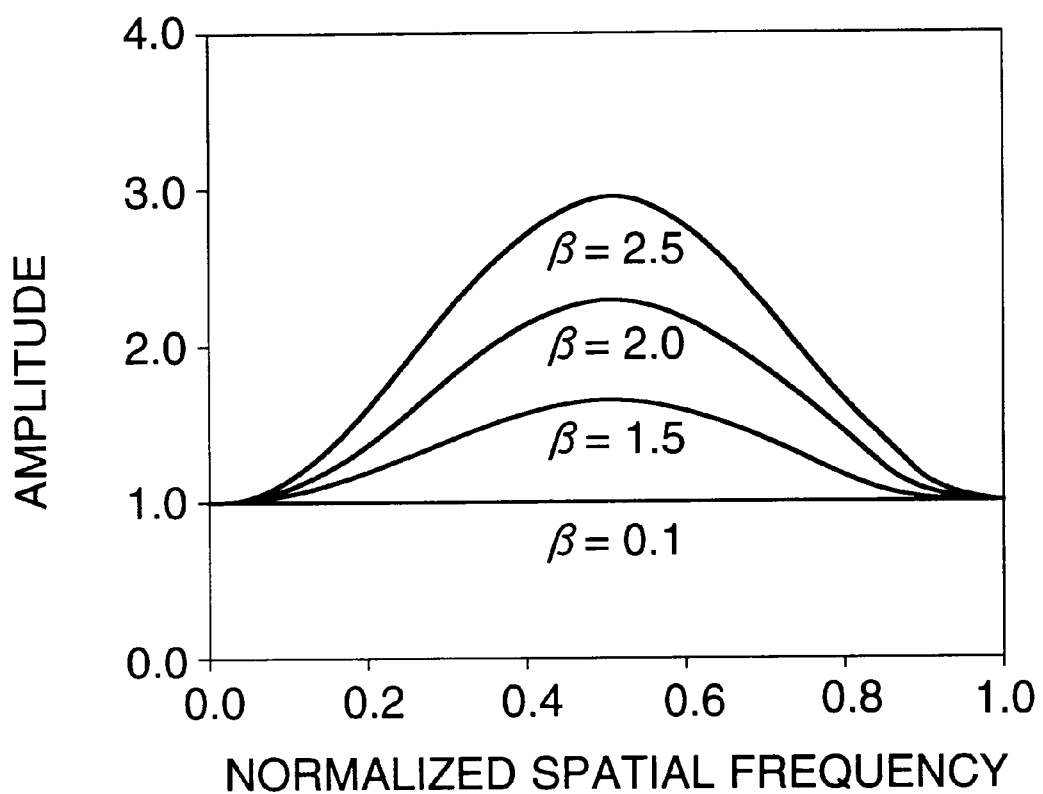
FIG. 10 is a diagram illustrating the correlation between frequency characteristic of interpolation matrix and interpolation processing coefficient $\beta$.

The frequency characteristic of the above-mentioned interpolation matrix varies in accordance with the edge enhancing coefficient β as shown in FIG. 10. Above FIG. 10 represents the frequency characteristics of a vertical and a horizontal direction of the interpolation matrix of the Red signal or Blue signal at the pixel on which the Red or blue filter in the primary color mosaic filter. It is found that when β is 1 or more, the interpolation matrix holds the band-pass filter characteristic.

On the other hand, the MTF (Modulation Transfer Function) of an optical system varies according to an aperture stop or focal length. Therefore, with an object for the compensation of MTF deterioration obtained by the measurement MTF together with the aperture stop and focal length, β may be put as a variable.

For example, the MTF of a camera is subjected to band limitation at the ½ Nyquist frequency of a CCD by the optical low-pass filter. FIG. 11(A) shows an example in the case of F2.8 and F11. The edge enhancing coefficient β corresponding to the MTF is determined. When the ¼ Nyquist frequency is employed, the following calculating formula is obtained according to the results obtained by performing the Fourier transform for the interpolation matrix in Table 7.

$$\beta = 1.5H - 0.5$$

wherein H is a reciprocal of MTF at the ¼ Nyquist frequency. At F2.8, H=4.6 and at F11, H=3.1, and β is 6.4 and 4.15, respectively.

Namely, in this manner, β may be put as a variable corresponding to the MTF of the camera.

Figure 11:
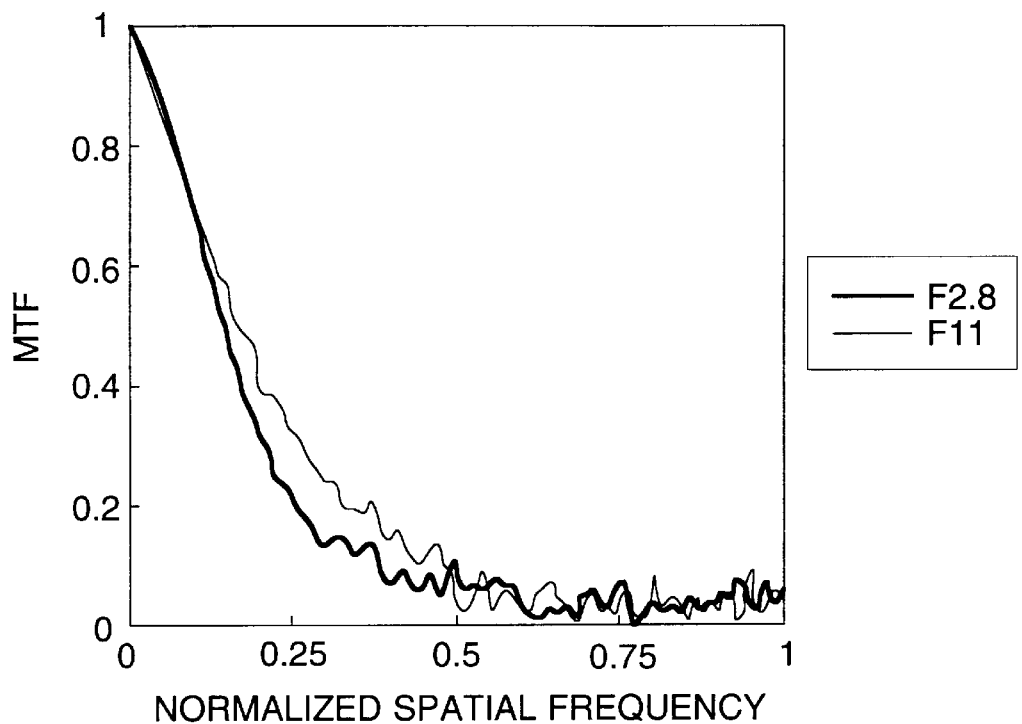
FIG. 11(A) is a diagram illustrating an example of MTF at F2.8 and F11.
FIG. 11(B) is a diagram illustrating an example of MTF characteristic and coefficient $\beta$ corresponding to said example.
Figure 11:
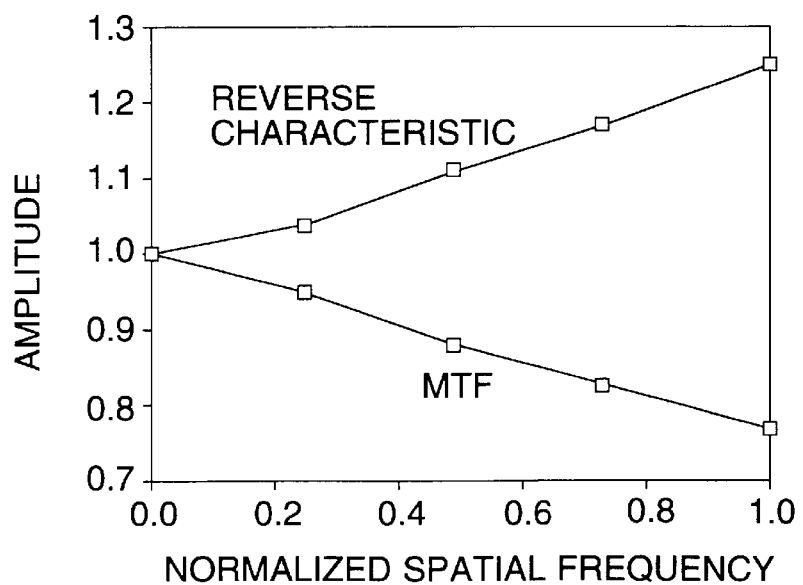

For example, when the MTF of an image photographed by a CCD shows the characteristic shown in FIG. 11, the interpolated matrix approximated to the reverse characteristic is required in order to correct the MTF. For example, an approximation performed at the ½ Nyquist frequency of a CCD results in the following.

When the frequency characteristic of an interpolation matrix is represented by Pant $P_{hnyp}$, $P_{hnyp}$ is represented by the following formula upon performing the Fourier transform for the interpolation matrix in Table 7.

$$P_{hnyp}=-0.333+1.333\beta$$

TABLE 7

| | | | | |
|---|---|---|---|---|
| (1 − β)/9 | 0 | (1 − β)/9 | 0 | (1 − β)/9 |
| 0 | 0 | 0 | 0 | 0 |
| (1 − β)/9 | 0 | (1 + 8*β)/9 | 0 | (1 − β)/9 |
| 0 | 0 | 0 | 0 | 0 |
| (1 − β)/9 | 0 | (1 − β)/9 | 0 | (1 − β)/9 |

When the amplitude of the reverse characteristic is represented by $F_{hnyp}$, the following formula is obtained.

$$\beta=(F_{hnyp}+0.333)/1.333$$

Furthermore, the marked frequency may be represented by frequency at which the spatial response of human eyes is at maximum or may be matched average-wise to the whole frequency band.

Furthermore, since the MTF of a lens varies on a concentric circle from the image center, the MTF is measured corresponding to the variation and β may be put as a variable at each pixel position.

In the following, an efficient calculation method for the image interpolation is explained.

Here, when the RGB mosaic filter in FIG. 2 is employed, the calculation of the average value in the 5×5 pixel region is illustrated.

As mentioned later, for the calculation of the average value, the memory equivalent to 4 lines is used for the horizontal direction of the image. Said memories are represented by add2, add3, add20 and add30, respectively. Calculation procedures are shown in the following.

(1) To the add3 is input the total of three pixels in the vertical direction of the three lines of the first, third and fifth site from the top corresponding to G11, G31 and G51 pixels on the extreme left column in FIG. 2. Eventually, when pixels in the horizontal direction of each line are represented by line1[i], line2[i], line3[i], . . . (i=1 to the number of pixels in the horizontal direction), the following formula is put.

add3[i]=line1[i]+line3[i]+line5[i]

For example, the following formulas are put.

add3[1]=line1[1]+line3[1]+line5[1]=G11+G31+G51 add3[2]=line1[2]+line3[2]+line5[2]=R12+R32+R52

(2) In add2 is input the total of two pixels in the vertical direction of the two lines of the second and the forth from the top corresponding to B21 and B41 of each of pixels in the extreme left column in FIG. 2.

add2[i]=line2[i]+line4[i]

For example, the following formulas are put.

add2[1]=line2[1]+line4[1]=B21+B41 add2[2]=line2[2]+line4[2]=G22+G42

(3) Average values R33', G33' and B33' of each of R signals, G signals and B signals in the 5×5 pixel region in which the target pixel G33 is positioned in the center are calculated as follows.

R'=add3[2]+add3[4]

G'=add2[2]+add2[4]+add3[1]+add3[3]+add3[5]

B'=add2[1]+add2[3]+add2[5]

R33'=R'/6

G33'=G'/13

B33'=B'/6

(4) In FIG. 2, when R34 next G33 on the right side is put as a target pixel, the average value of each color is obtained as follows.

R'=R'+add3[6]

G'=G'−add3[1]+add2[6]

B'=B'−add2[1]

R34'=R'/9

G34'=G'/12

B34'=B'/4 wherein R' in R'+add3[6] is the total of R signals obtained at G33; G' in G'−add3[1] is the total of G signals and B' in B'−add2[1] is the total of B signals.

(5) Furthermore, when G35 next R34 on the right side is put as a target pixel, the average value of each color is as follows.

R'=R'−add3[2]

G'=G'+add3[7]−add2[2]

B'=B'+add2[7]

R35'=R'/6

G35'=G'/13

B35'=B'/6 wherein R' in R'−add3[2] is the total of R signals obtained at R34, G' in G'+add3[7]−add2[2] and B' in B'+add2[7] are defined in the same way as above.

(6) The above-mentioned calculation is repeated successively in the horizontal direction.

(7) Next, the target pixel is transferred to the line of B41. Here, the total in the horizontal direction is obtained by the following formulas and the calculation is performed in accordance with the same procedures as those of the above-mentioned (3) to (6).

add20[i]=add2[i]

add30[i]=add3[i]

add2[i]=add30[i]−line1[i] or add2[i]=add3[i]+lines5[i]

add3[i]=add20[i]+line6[i]

Further, each line memory of add2[i] and add30[i] is required for keeping the previous values at setting new values of add2[i] and add3[i] as mentioned above.

(8) (3) to (7) are repeated and the average value for all the pixels is calculated.

In the above-mentioned manner, when the line memory is utilized, the calculation volume is decreased and thus, the interpolation operation is efficiently performed as compared to the case wherein signals of each pixel contained in the 5×5 pixel region for each target pixel is totaled at each time.

Figure 8:
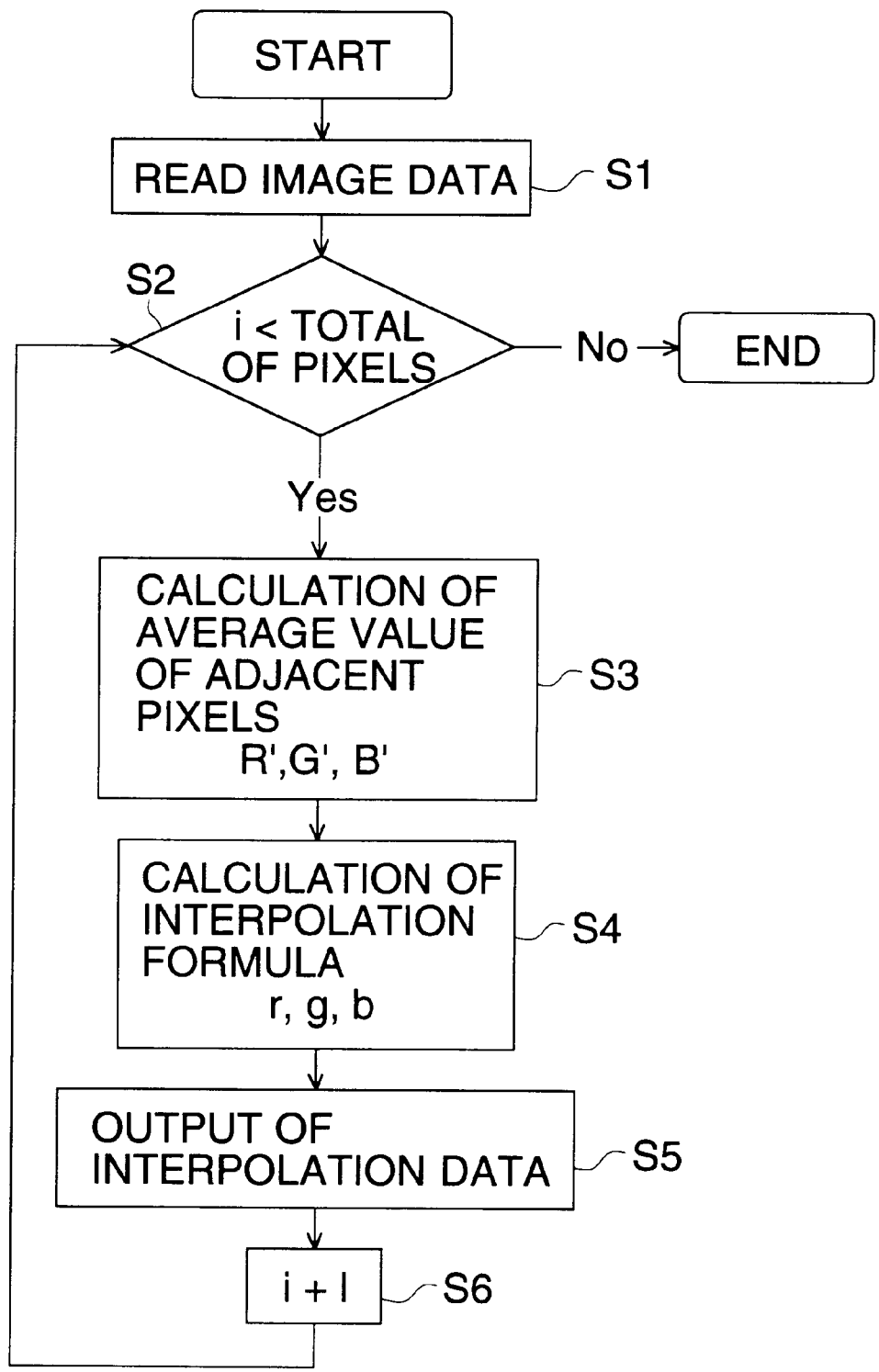
FIG. 8 is a flow chart illustrating software for the interpolation operation in an RGB mosaic filter.
Figure 9:
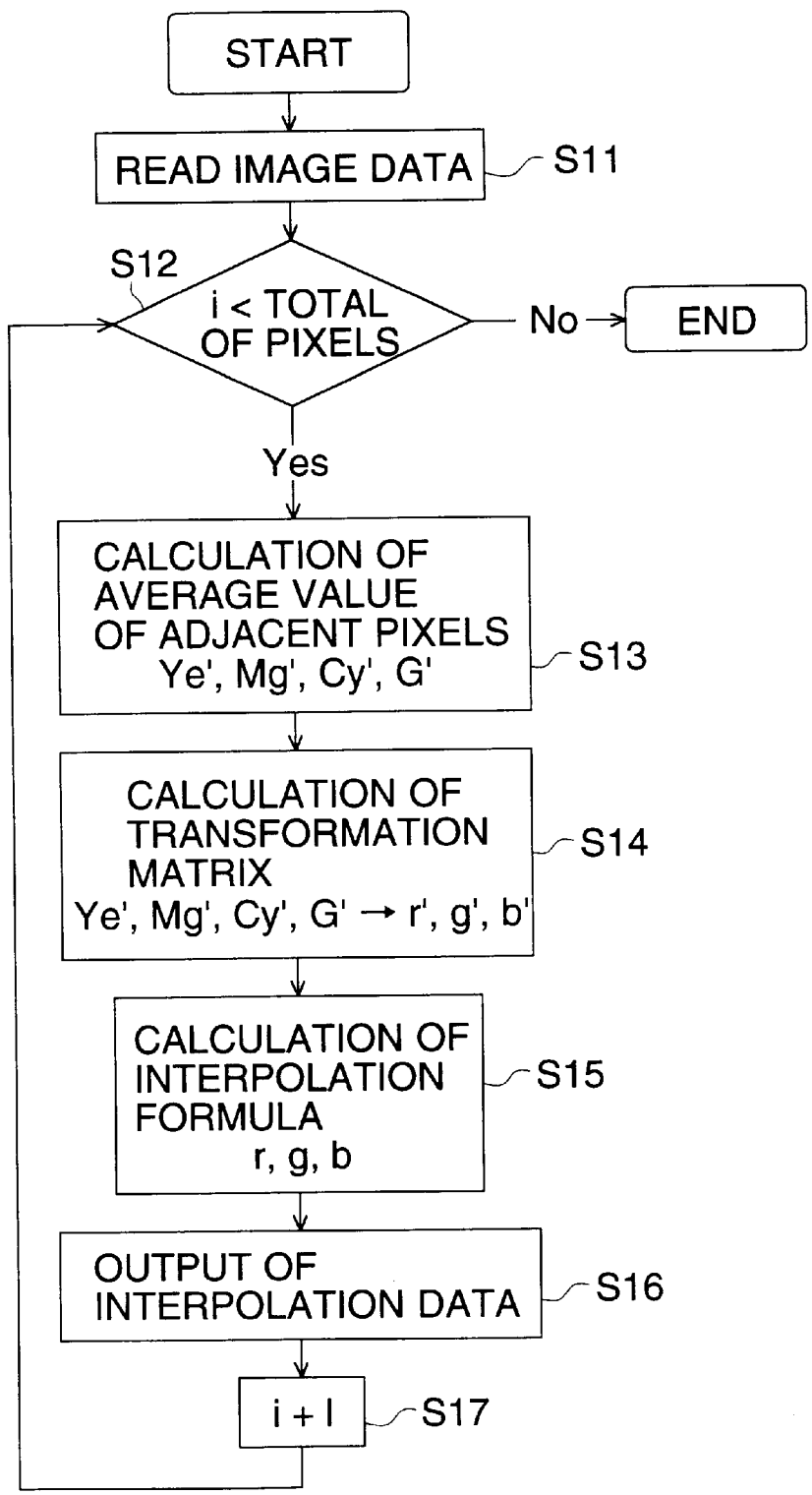
FIG. 9 is a flow chart illustrating software for the interpolation operation in an YMCG mosaic filter.

Incidentally, the above-mentioned interpolation calculation is practiced with software by sending the image data before the interpolation to a computer. FIG. 8 shows an example of an interpolation method by the software process and FIG. 9 shows the flow chart.

The flow chart in FIG. 8 shows the interpolation by the software process utilizing the RGB mosaic filter.

Firstly, image data are read (S1), discrimination is then performed on whether the interpolation calculation for all the pixels are finished or not (S2). When the interpolation for all the pixel are not finished, the average values R', G' and B' of each color for pixels adjacent closely to the target pixel (pixels in 5×5 pixel region) are calculated (S3).

And interpolation values r, g and b are calculated utilizing the above-mentioned average values R', G' and B' (S4).

The above-mentioned calculated interpolation values are output (S5) and the next target pixel is then set (S6). The process returns to the above-mentioned S2 and the discrimination is performed on whether interpolation on all the pixels is finished or not. Until the interpolation is finished for all the pixels, the above-mentioned processes S3 to S6 are repeated.

The flow chart in FIG. 9 shows the interpolation by the software process when the YMCG mosaic filter in FIG. 4 is utilized.

Firstly, image data is read (S11) and discrimination is then performed on whether the interpolation calculation for all the pixels are finished or not (S12). When the interpolation calculation is not finished for all the pixels, average values Ye', Mg', Cy' and G' of each color of pixels adjacent closely to the target pixel are calculated (S13).

Next, the above-mentioned average values Ye', Mg', Cy' and G' are transformed to r', g' and b' (S14).

And interpolation values r, g and b are calculated utilizing the above-mentioned r', g' and b' (S15).

The above-mentioned calculated interpolation values are output (S16) and the subsequent target pixel is then set (S17). Upon returning to the above-mentioned S12, discrimination is performed on whether the interpolation on all the pixels is completed or not. The above-mentioned processes S13 to S17 are repeated until the interpolation on all the pixels is finished.

Incidentally, in an electronic camera, white balance adjustment and gain adjustment for correcting the output variation in output of each pixel in the CCD are generally performed. On the other hand, the vignetting of a lens causes the decrease in marginal brightness of a image field. However, if the correction for the decrease in marginal brightness is performed at the same time of performing the above-mentioned white balance adjustment or/and the gain adjustment, the correction for the above-mentioned marginal brightness may be performed upon decreasing the calculation volume.

For example, when the white balance adjustment and gain adjustment are performed by multiplying the signals r, g and b interpolated as mentioned above by coefficients Ar, Ag and Ab, the correction is performed by multiplying the white balance and gain adjusting coefficients Ar, Ag and Ab by coefficients for correcting the decrease in the marginal brightness. Adjusted signals $r_0$, $g_0$ and $b_0$ are obtained utilizing said adjusted coefficients Ar, Ag and Ab.

Figure 12:
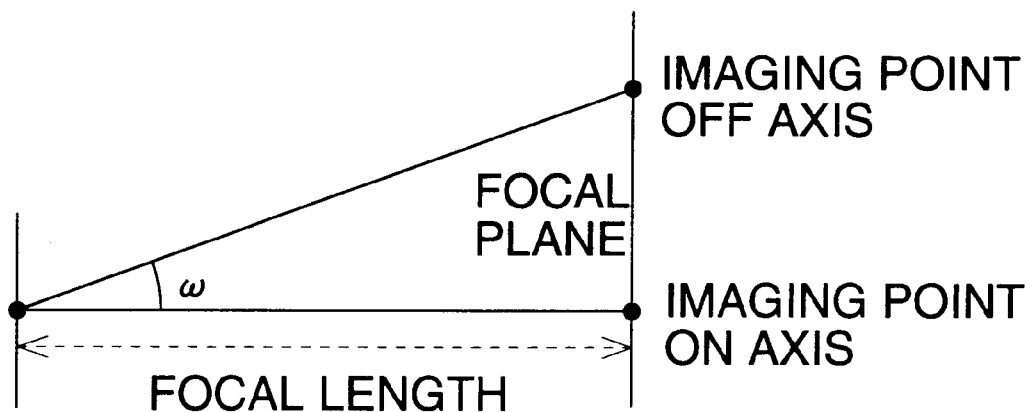
FIG. 12 is an illustration showing the distance between an axial focal point and an off-axial focal point on a focal plane.

Here, when the coefficient for correcting the decrease in the marginal brightness is represented by $\alpha$, said coefficient $\alpha$ is determined by the cosine forth power rule generally known and the simplified formula is as follows.

$$\alpha = 1/\cos^4 \omega$$

Wherein as shown in FIG. 12, $\omega$ is dependent of the focal length and the length between the focal point off axis and on axis. When they are put as f and x, the following formula is obtained.

$$\omega = \tan^{-1}(x/f)$$

On a CCD, a varies by ⅛ of the total pixels. Thus, it is desirable that a camera has data of $\alpha$ of this number in it. And new coefficients Ar, Ag and Ab obtained by multiplying this coefficient $\alpha$ by coefficients Ar, Ag and Ab set for the white balance and gain adjustments are stored in a memory and the stored coefficients Ar, Ag and Ab are multiplied by interpolated signals r, g and b.

The height and width of an image size are represented by H and W, respectively. When the white balance adjustment, gain adjustment and correction for the decrease in the marginal brightness are performed independently, the multiplication frequency of 3×H×W is required. However, when the correction for the decrease in the marginal brightness is performed as mentioned above, the multiplication frequency becomes 3×(H×W/4+H/2) and the multiplication frequency is reduced.

Further, the correction for the decrease in the marginal brightness may be subjected to a structure wherein either the white balance adjustment or gain adjustment is performed, or both of them are performed at the same time.

In the following, is explained the image data compression and decompression (extension) in the single plane electronic camera wherein the above-mentioned interpolation processes are performed.

Figure 13:
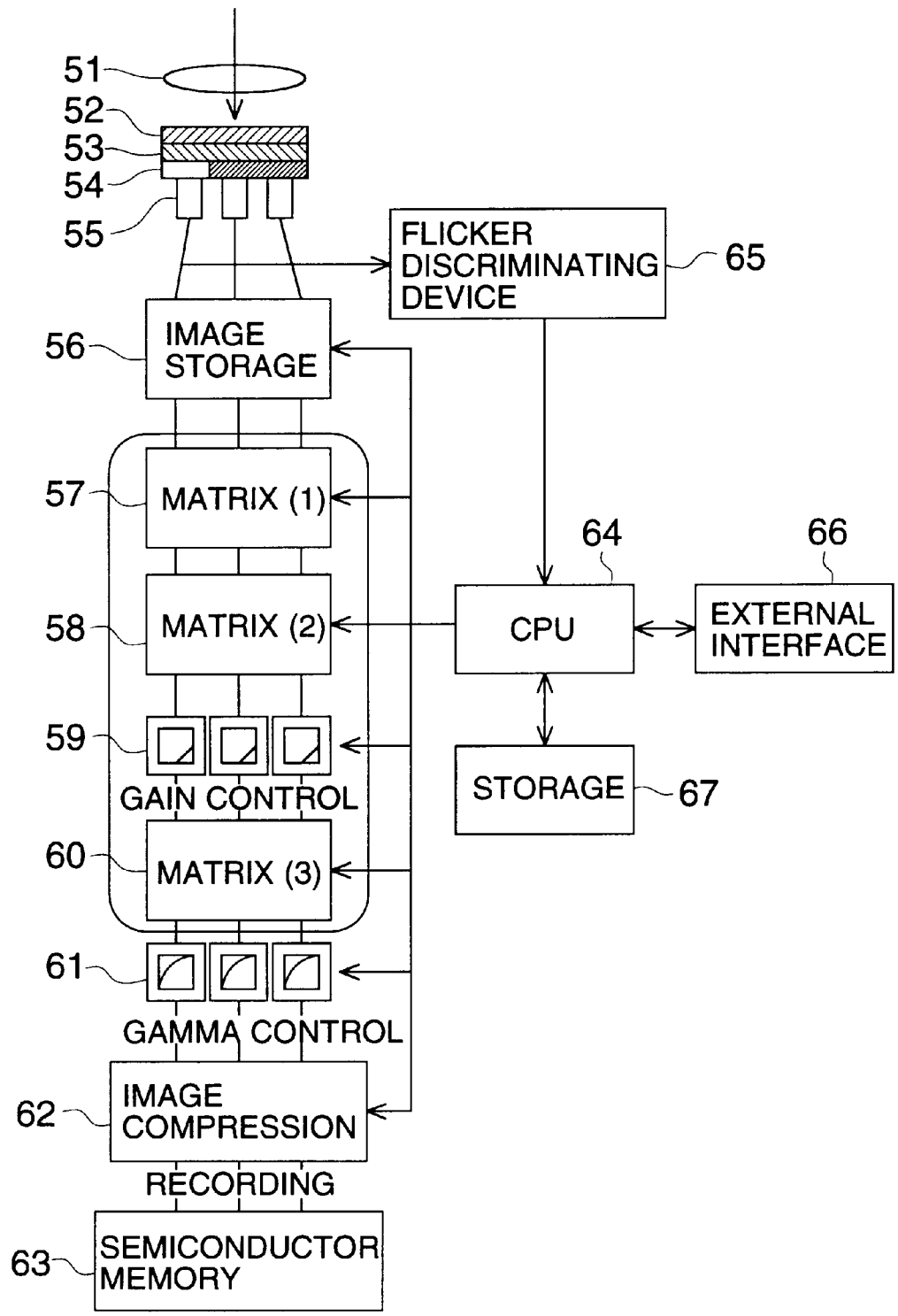
FIG. 13 is a block diagram of a detailed signal transformation process of an electronic camera in an example.

FIG. 13 illustrates in more detail a structure of the electronic camera shown in FIG. 1. An optical image from a subject not shown in the figure is irradiated onto a CCD 55 through a taking lens 51, a low-pass filter 52, an infrared radiation cutting filter 53 and a mosaic filter 54 composed of color filter combination such as RBG, CMY, etc. At the CCD 53, the above-mentioned optical image of the subject is photoelectrically converted and converted to electric signals.

The electric signals output from the above-mentioned CCD are A/D converted and are then stored once in an image storage 56.

The image data stored in the above-mentioned image storage 56 are first converted by a matrix (1) 57 so as to approach the signals when photographed under a standard light source. Subsequently, the resulting data are converted by a matrix (2) 58 so as to approach the stimuli to the human retina. However, the processing order of the matrix (1) 57 and the matrix (2) 58 may be reversed.

Subsequently, each of three values is multiplied by a coefficient utilizing a gain control 59, so that a suitable white point is secured. By performing the foregoing, a white balance is taken.

Next, the data are transformed by a matrix (3) 60 so that the signal values, when displayed on a CRT, become suitable figures. Furthermore, a tonal curve is adjusted by a gamma control 61 so as to matching the gamma characteristic of the CRT.

Furthermore, in an image compression section 62, the image data are subjected to compression process such as the JPEG compression and said compressed image data are recorded in a semiconductor memory 63.

A CPU 64 to which signals, etc. from a flicker discriminating device 65 are input controls the operation of the each of the above-mentioned processing sections and on the other side, inputs signals from the outside through an external interface 66. Further, a memory 67 is the memory wherein writing and reading data are performed according to the above-mentioned CPU 64.

Figure 14:
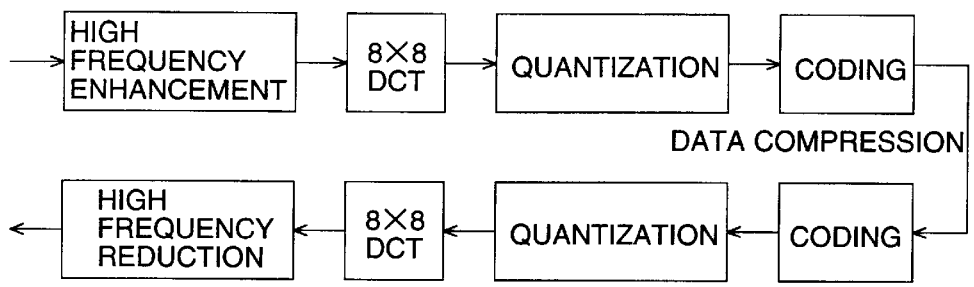
FIG. 14 is a block diagram illustrating a flow of a compression process and a decompression process.

Here, in the above-mentioned image compression section 62, the compression and decompression (extension) are performed as shown in FIG. 14.

As shown in FIG. 14, prior to the compression, the high frequency component is subjected to enhancement process; then, to DTC (Discrete Cosine Transformation) for each of 8×8 pixel block units; to quantization; are Huffman coded and the compressed data are obtained. When the compressed data are decompressed (extended), the data are subjected to the reversed processes and after the depression, the high frequency component is subjected to reduction process.

As mentioned above, when a structure is employed wherein prior to the compression, the high frequency component is subjected to enhancement process and after the decompression, is subjected to decrease process, without discriminating the presence of the flat portion of an image or block distortion, the block distortion caused by the compression process may be decreased utilizing the process (low-pass filter) which decreases the high frequency component.

Further, in the JPEG compression wherein the DCT transformation is carried by making 8×8 pixel one block, a block boundary is set every 8 pixels and the block distortion is employed wherein in the boundary portion. Therefore, when a structure is employed wherein the boundary portion every 8 pixels is only subjected to process for decreasing the high frequency component, the block distortion is more effectively reduced.

Figure 15:
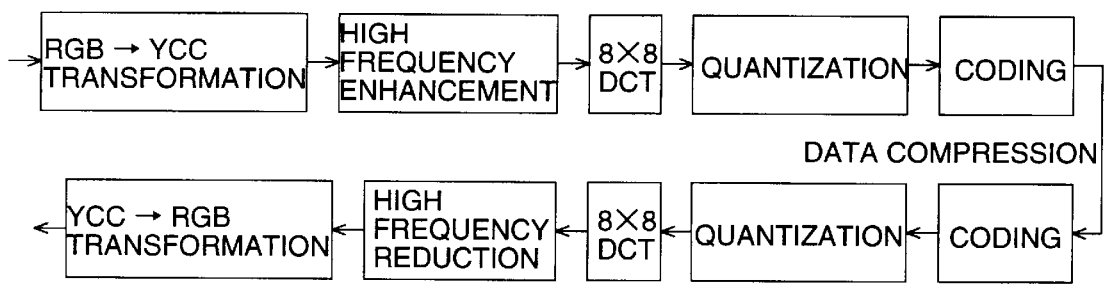
FIG. 15 is a block diagram illustrating a flow of a compression process and a decompression process accompanied with YCbCr transformation.

In the structure shown in FIG. 14, each of RGB signals is subjected to enhancement and reduction in the high frequency component. However, as shown in FIG. 15, the structure may be that prior to the compression, RGB signals are transformed to YCC signals (signals composed of brightness Y signal and color C signal); the brightness Y signal is only subjected to the enhancement process of the high frequency component; the compression process is then practiced; after the decompression, the brightness Y signal is only subjected to reduction process in the high frequency component; the resulting signals are then transformed to the RGB signals and the resulting RGB signals are output. As mentioned above, when the structure is utilized wherein the brightness Y signal is only subjected to enhancement process of the high frequency component, the reduction in calculation load is practiced.

Further, the transformation between the RGB signals and the YCC signals may be performed utilizing a matrix operation. For example, the transformation matrix to Y, $E_{ry}$, $E_{by}$ is as follows.

| 0.299 | 0.587 | 0.144 |
|---|---|---|
| 0.701 | −0.587 | −0.144 |
| −0.299 | −0.587 | 0.886 |

Furthermore, the reverse transformation matrix is as follows.

| 0.971 | 1.000 | −0.029 |
|---|---|---|
| 0.971 | −0.509 | −0.223 |
| 0.971 | 0.000 | 0.971 |

However, the matrix has various modified examples.

The enhancement and reduction processes of the above-mentioned high frequency component may be performed utilizing either hardware or software, In addition, the structure may be available wherein at the compression, the enhancement process is performed after the DTC transformation and at the decompression, the reduction process is performed prior to the DCT transformation. Furthermore, various well known methods may be available as the methods for the enhancement and reduction in the high frequency component. However, the high frequency component can be precisely processed utilizing a space filter. Furthermore, the Fourier transform may be utilized for processing the high frequency component.

Furthermore, a structure may be utilized wherein the enhancement process of the high frequency component prior to the compression is performed at the same time when the interpolation operation of the image signals of the above-mentioned mosaic filter is performed.

For example, at performing the interpolation operation as shown in above Table 2, when the coefficient β is too large, the sharpness of an image becomes high (the high frequency component is enhanced.). Therefore, for example, in the region of β=2 or near, a structure may be utilized wherein in order to reduce the block distortion, the enhancement process of the high frequency component and the interpolation operation are performed at the same time.

Further, when the kind of the mosaic filter is different, the interpolation operation formulas shown in the above Tables 4 to 6 may be utilized and the enhancement of the high frequency component may be performed utilizing the edge enhancing coefficient β.

Figure 16:
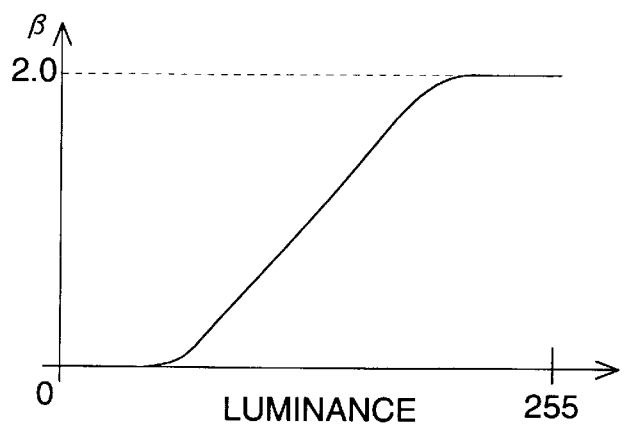
FIG. 16 is a diagram illustrating the relation between sharpness adjusting coefficient $\beta$ and image brightness.

Furthermore, in all the above-mentioned examples, the image photographed by the CCD 2 carries conspicuous noise in the part of low brightness and no conspicuous noise at the part of high brightness. Accordingly, when the enhancement is lowered for the part of the low brightness and is raised for the part of the high brightness, the sharpness may be improved without making the noise so conspicuous. It may be practiced in such a way that the brightness is obtained by adding the average value of G for the primary color filter and the average value of Ye and Cy for the complementary color filter and for the resulting brightness, the table is prepared such as shown in FIG. 16 and the sharpness adjusting coefficient β is varied for each of pixels.

Furthermore, in the foregoing, the compression process in the electronic camera employing the single plate mosaic filter is described. However, for the reduction in the block distortion, the enhancement of the high frequency component prior to the compression and the reduction process after the decompression are not limited to the above-mentioned electronic camera but may be utilized properly.

Accordingly, the advantages of the present invention are that according to the average value of each color in the desired region in which the target pixel subjected to the interpolation process is positioned in the center and the signal value at a target pixel, the interpolation process is performed, and thus, color reproduction and sharpness are improved and interpolation values are obtained by a comparatively simple process.

Furthermore, the advantages of the present invention are that even when utilizing a camera having neither a Red filter nor a Blue filter, the color reproduction and the sharpness are improved and further, a simple process interpolation may be performed.

Furthermore, the advantages of the present invention are that upon comparing the signal of the target pixel to the average value of the pixel having the same filter color as that of the target pixel in the desired region, the interpolation values may be obtained according to the features in the desired region of the signals of the target pixel, and accordingly, the excellent color reproduction may be obtained.

Furthermore, the advantages of the present invention are that according to the interpolation process, the edge enhancement may be performed, and accordingly, the image having excellent sharpness may be obtained.

Furthermore, the advantages of the present invention are that while performing the edge enhancement, the interpolation process improving the color reproduction may be performed.

Furthermore, the advantage of the present invention is that for the color filter which is not equipped with a Red filter and a Blue filter such as G, Ye, Mg, Cy, etc., interpolation values of R and B may be obtained simply while improving the color reproduction.

Furthermore, the advantage of the present invention is that the deterioration of MTF according to the variation in an aperture stop or focal length may be corrected at the interpolation process.

Furthermore, the advantage of the present invention is that the pseudo-color at the edge portion may be decreased.

Furthermore, the advantages of the present invention are that the operation of the average value (total of signal values) in the desired region may be performed efficiently and the processing speed may be increased.

Furthermore, the advantage of the present invention is that the decrease in the marginal brightness may be easily corrected.

Furthermore, the advantage of the present invention is that the block distortion may be reduced utilizing a simple imaging process without the deterioration in image quality.

Furthermore, the advantage of the present invention is that the block distortion may be more effectively reduced utilizing a simple imaging process without the deterioration in image quality.

Furthermore, the advantage of the present invention is that in an electronic camera, the deterioration in image quality accompanied with the compression and decompression of the image data may be prevented using a simple imaging process.

Furthermore, the advantages of the present invention are that in an electronic camera utilizing a mosaic-like color filter, the block distortion and the artifact may be reduced at the same time.

Furthermore, the advantages of the present invention are that the enhancement of the high frequency component may be performed utilizing the interpolation process for the mosaic-like color filter, and the signal processing may be simplified without setting up separately the function for enhancing the high frequency component.

Furthermore, the advantages of the present invention are that a degree of freedom for processing the high frequency component is high and the precise interpolation may be applied.

Furthermore, the advantage of the present invention is that the operation load in processing the high frequency component may be reduced while letting the brightness Y signal is only put as a processing target.

What is claimed is:

1. An image processing method of an electronic camera which comprises a photoelectric conversion element having a plurality of sensors and color filters in a plurality of different colors, wherein each of said plurality of sensors corresponds to a respective one of said color filters in said different colors, said method comprising the steps of:

obtaining a signal value from a target sensor of said plurality of sensors when one of said plurality of said sensors is assigned to said target sensor;

obtaining a first average value from signal values of said plurality of sensors having said color filters of which a color is the same as that of one of said color filters corresponding to said target sensor;

obtaining a second average value from signal values of said plurality of sensors having said color filters of which a color is different from that of one of said color filters corresponding to said target sensor; and obtaining an edge-enhanced interpolation value for a color, which is different from that of said one of said color filters corresponding to said target sensor, of said target sensor according to said signal value from said target sensor, said first average value and said second average value;

wherein at least one of said color filters is of a green color; and wherein said step of obtaining said interpolation value includes a step of:

obtaining an interpolation value g for green of said target sensor, when said one of said color filters corresponding to said target sensor is of a color other than green, according to the following equation:

$$g=G'+\beta(X-X')$$

wherein X represents a signal value from said target sensor, G' represents said first average value, X' represents said second average value, and $\beta$ represents an edge enhancing coefficient.

2. The method of claim 1, wherein said step of obtaining said interpolation value includes a step of:

obtaining an interpolation value g for green of said target sensor, when said one of said color filters corresponding to said target sensor is of a green color, according to the following equation:

$$g=G'+\beta(G-G')$$

wherein G represents said signal value from said target sensor, G' represents said first average value and $\beta$ represents an edge enhancing coefficient.

3. An image processing method of an electronic camera which comprises a photoelectric conversion element having a plurality of sensors and color filters in a plurality of different colors, wherein each of said plurality of sensors corresponds to a respective one of said color filters in said different colors, said method comprising the steps of:

obtaining a signal value from a target sensor of said plurality of sensors when one of said plurality of said sensors is assigned to said target sensor;

obtaining a first average value from signal values of said plurality of sensors having said color filters of which a color is the same as that of one of said color filters corresponding to said target sensor;

obtaining a second average value from signal values of said plurality of sensors having said color filters of which a color is different from that of one of said color filters corresponding to said target sensor; and obtaining an edge-enhanced interpolation value for a color, which is different from that of said one of said color filters corresponding to said target sensor, of said target sensor according to said signal value from said target sensor, said first average value and said second average value;

wherein at least one of said color filters is of a green color; and wherein said step of obtaining said interpolation value includes a step of:

obtaining an interpolation value b for blue of said target sensor, when said one of said color filters corresponding to said target sensor is of a color other than blue, according to the following equation:

$$b=B'+\beta(Y-Y')$$

wherein Y represents a signal value from said target sensor, B' represents said first average value, Y' represents said second average value, and β represents an edge enhancing coefficient, and obtaining an interpolation value r for red of said target sensor, when said one of said color filters corresponding to said target sensor is of a color other than red according to the following equation:

$$r=R'+\beta(Z-Z')$$

wherein Z represents a signal value from said target sensor, R' represents said first average value, Z' represents said second average value, and β represents an edge enhancing coefficient.

4. The method of claim 3, wherein said step of obtaining said interpolation value includes a step of:

obtaining an interpolation value b for blue of said target sensor, when said one of said color filters corresponding to said target sensor is of a blue color, according to the following equation:

$$b=B'+\beta(B-B')$$

wherein B represents a signal value from said target sensor, B' represents said first average value and β represents an edge 5. The method of claim 1, wherein said edge enhancing coefficient β is varied according to modulation transfer function of an optical system of said electronic camera.

6. An image processing method of an electronic camera which comprises a photoelectric conversion element having a plurality of sensors and color filters in a plurality of different colors, wherein each of said plurality of sensors corresponds to a respective one of said color filters in said different colors, said method comprising the steps of:

obtaining a signal value from a target sensor of said plurality of sensors when one of said plurality of said sensors is assigned to said target sensor;

obtaining a first average value from signal values of said plurality of sensors having said color filters of which a color is the same as that of one of said color filters corresponding to said target sensor;

obtaining a second average value from signal values of said plurality of sensors having said color filters of which a color is different from that of one of said color filters corresponding to said target sensor; and obtaining an edge-enhanced interpolation value for a color, which is different from that of said one of said color filters corresponding to said target sensor, of said target sensor according to said signal value from said target sensor, said first average value and said second average value;

wherein at least one of said color filters is of a color selected from green, and at least one other of said color filters is of a complementary color other than blue and red. enhancing coefficient, and obtaining an interpolation value r for red of said target sensor, when said one of said color filters corresponding to said target sensor is of a red color, according to the following equation:

$$r=R'+\beta(R-R')$$

wherein R represents a signal value from said target sensor, R' represents said first average value and P represents an edge enhancing coefficient.

7. The method of claim 6, wherein each of said color filters is of a color selected from green, yellow, cyan and magenta.

8. The method of claim 7, wherein said step of obtaining said interpolation value includes a step of:

obtaining an interpolation value g for green of said target sensor, when said one of said color filters corresponding to said target sensor is of a color other than green, according to the following equation:

$$g=G'+\beta(X-X')$$

wherein X represents a signal value from said target sensor, G' represents said first average value, X' represents said second average value, and β represents an edge enhancing coefficient.

9. The method of claim 8, wherein said step of obtaining said interpolation value includes a step of:

obtaining an interpolation value g for green of said target sensor, when said one of said color filters corresponding to said target sensor is of a green color, according to the following equation:

$$g=G'+\beta(G-G')$$

wherein G represents said signal value from said target sensor, G' represents said first average value and f represents an edge enhancing coefficient.

10. The method of claim 7, wherein said step of obtaining said interpolation value includes a step of:

obtaining both an interpolation value b for blue of said target sensor and an interpolation value r for red of said target sensor according to the following equations:

$$b=b'+\beta(Y-Y')$$

$$r=r'+\beta(Y-Y')$$

wherein Y represents said signal value from said target sensor, Y' represents said first average value, β represents an edge enhancing coefficient, and b' and r' are obtained according to the following equations:

$$b'=Ye'+Mg'+Cy'$$

$$r'=Ye'+Mg'-Cy'$$

wherein Ye', Mg', and Cy' respectively represent average values of said plurality of said sensors in yellow, magenta, and cyan.

11. The method of claim 8, wherein said edge enhancing coefficient β is varied according to modulation transfer function of an optical system of said electronic camera.

12. The method of claim 6, wherein said color filters in said different colors are arranged according to a predetermined rule.

13. The method of claim 12, wherein said color filters in said different colors are arranged in a checkerboard pattern.

* * * * *